May 10, 1949. D. C. HOLT 2,469,965
ALIGNING CLAMP FOR WELDING
Filed Jan. 29, 1946
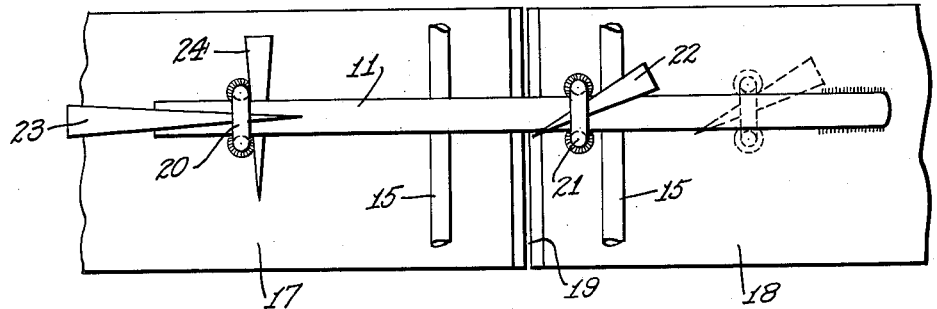
Fig.1.
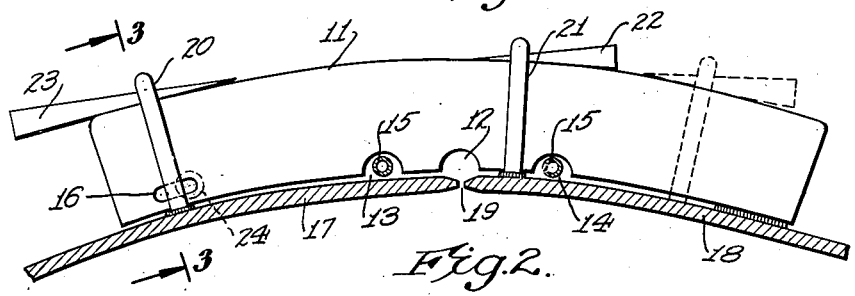
Fig.2.
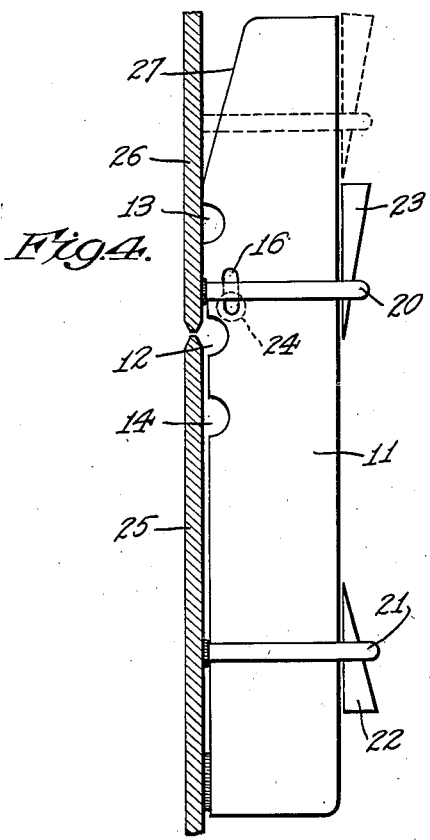
Fig.4.
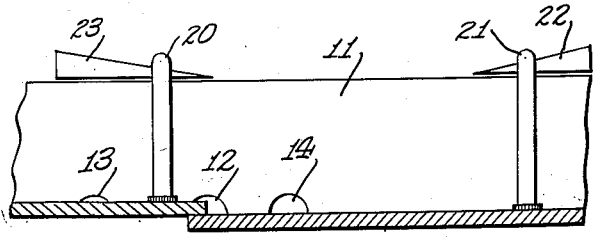
Fig.3.
Fig.5.
INVENTOR.
DONALD C. HOLT
BY E. F. Liebrecht
William Klabunde
ATTORNEYS Patented May 10, 1949

2,469,965

UNITED STATES PATENT OFFICE 2,469,965

ALIGNING CLAMP FOR WELDING

Donald C. Holt, Oradell, N. J., assignor to The M. W. Kellogg Company, New York, N. Y., a corporation of Delaware Application January 29, 1946, Serial No. 644,086

4 Claims. (Cl. 113—99)

This invention relates to apparatus for aligning and holding in alignment plate material to be welded, and is particularly directed to improvements in apparatus for holding together heavy sheet or plate material preparatory to welding the edges.

My improved welding apparatus has a general application in the joining of members to be welded, and is especially well adapted for the type of welding required in the fabrication of structural members and in the manufacture of tanks, towers, and other vessels in common use in the chemical processing and oil refining industries.

In the fabrication of large vessels by means of rolling or otherwise shaping one or more metal plates or sheets to the desired contour and uniting the edges by welding, it is the usual practice to employ various rigging devices or jigs for assembling the parts to be united in a manner suitable for welding the adjacent or adjoining edges, and for holding said parts during and after said welding operation so that distortion resulting from the welding is controlled, and permanent distortion due to weld-metal shrinkage upon cooling is minimized.

Various expedients have heretofore been employed, such as lugs and strap or bar members attached to the plate members and wedges adapted for insertion therebetween to cause lateral movement of the members to be joined into a position suitable for welding. Among the difficulties inherent in many of the devices now in use, the following have been especially noted. The strap or bar members extending across the welding groove and interengaging the lugs attached to the plate members to provide openings or spaces therebetween for the insertion of wedges, bull pins, or the like have a tendency to warp with the plate members by reason of the stresses induced by the shrinkage of the deposited weld metal. In the fabrication of heavy-duty pressure vessels, the steel plate member or members may be one and a half or more inches in thickness, in which case a flat strap or bar placed on the surface of the plate and extending across the seam will have a tendency to distort by bending or warping in conformity with the distortion in the welded plate member resulting from the stresses set up during and after the welding operation. To overcome such tendency, it may be necessary to employ a strap or bar of such enlarged dimensions as to be both cumbersome and costly; or, in some cases, suitable strength may be provided by reenforcing members extending along the outer surface of the strap, such members being commonly referred to in the art as "strong-backs." Such reenforcement is sometimes provided by the use of angle or channel members for the strap, in which cases the sides of the strap normal to the surface of the plate members provide the strong-back reenforcement. Further difficulties are encountered by reason of the fact that the strap member in passing transversely over the welding groove prevents the continuous deposition of weld metal along the seam. In most of the present devices the width of the strap is such that the deposition of weld metal must be interrupted at the point where the strap extends over the groove, and the rigging device must be removed in order that the welding operation may be resumed. It is obvious, therefore, that a plurality of such devices is required so that the removal thereof as the welding operation progresses will not permit the plate members to separate or be otherwise displaced from the position arranged preparatory to welding. While this would not necessarily present a difficulty in the welding of a long seam, in which case a plurality of such rigging devices would be required, it would in the case of a short seam require a plurality of such devices, where normally one might be sufficient. Another difficulty occurs in cases where it is found desirable or necessary to preheat the plate members in the area of the desired weld in order to minimize the undesirable stress effects caused by localized heating during the welding operation. It is common practice to employ for this purpose heating elements extending parallel to and on either side of the welding groove so that the plate members may be brought to the desired pre-welding temperature in the areas adjacent the groove. The rigging devices in common use often interfere with the proper placement of the heating elements by reason of the fact that the rigging devices cut transversely across the paths of the heating elements, often necessitating either an interruption of the heating zone or lateral displacement of the heating elements to an undesirable extent away from the plate members in order to pass over the rigging devices.

It is therefore an object of the present invention to provide for the purposes heretofore mentioned an improved rigging device which will obviate all or most of the foregoing disadvantages. More specifically, a primary object of my invention is to provide a rigging device of simple construction which may easily be assembled from readily available parts and which may be easily erected on the plate members to be welded.

Another object of my invention is to provide a rigging device which when attached to adjoining plate members offers maximum resistance to distortion in a plane normal to the surface of the plate members, and which is so arranged with respect to the welding groove as not to require interruption of the welding operation in that portion of the groove area covered by the strap, and which further permits the uninterrupted extension thereunder of heating elements for preheating the plate areas adjacent the welding groove.

These and other objects are effected by my invention, as will be apparent from the following description and claims taken in connection with the accompanying drawings forming a part of this application, in which:

Fig. 1 is a plan view showing the rigging device in position on two plate members juxtaposed to form a welding groove;

Fig. 2 is an elevation of the attached rigging device shown in Fig. 1;

Fig. 3 is an end section taken along line 3—3 of Fig. 2;

Fig. 4 is a modified form of strong-back member adapted for use in uniting cylindrical members; and Fig. 5 is a further modification of the strong-back member adapted for use in making lap-welded joints.

In accordance with my invention I provide an arcuate strong-back member 11, preferably of substantially heavy-gauge steel plate material, and having on its inner arcuate edge recessed portions 12, 13 and 14, as shown in Fig. 2. The central recess 12 is provided to bridge the weld area so that when the arcuate member is in its proper position with the recess 12 directly over the welding groove, the weld metal may be deposited in the groove as a continuous operation without removing the rigging device. The welding rod may be inserted from one side of member 11 half way under the recess 12, and then continued at the point left off from the opposite side of member 11. Recesses 13 and 14 are provided in member 11 to permit the passage thereunder of heating elements 15 which extend along each of the adjoining plate members adjacent and parallel to the welding groove. One or more slots 16 are provided, as shown in Fig. 2, near the inner edge of arcuate strap member 11, and preferably longitudinally removed from the recessed area.

Member 11 is placed across the gap between the plate members 17 and 18, the latter being initially brought as near as possible to the position desired for forming the seam-weld. The adjacent or abutting edges of the plate members 17 and 18 are prepared for welding in the usual manner, that is by chamfering, so that when brought together they may form either a single or a double welding groove 19. Member 11 is disposed normal to the surface of the plate members and at a right angle to the welding groove. U-members 20 and 21 are then placed in inverted position over the member 11 at spaced points therealong, one U-member, however, being placed on each of the plate members 17 and 18. The U-members 20 and 21 may be formed from standard stock material bent to the desired shape. It has been found suitable and preferable, however, to use standard U-bolts of the desired size, since they are usually readily available. The U-bolts, as shown in Fig. 3, are of sufficient size to permit free movement of the member 11 between the side arms, and to permit the insertion of a bull pin between the curved portion of the U-bolt and the outer arcuate edge of the member 11. The ends of U-bolts 20 and 21 are secured to the surface of the plates 17 and 18, respectively, as by welding. U-bolt 20 is placed over member 11 and secured to plate 17 so that it is substantially centrally positioned with respect to slot 16. In such position it is possible to insert a bull pin through the slot 16 from either side of the U-bolt. In assembling the device, the member 11 is first properly positioned with respect to the welding groove 19 and then the U-bolts are attached to the plate members in their proper positions, that is, one on each of the plate members 17 and 18. A bull pin 22 is then driven between the member 11 and the end of the U-bolt 21 in a direction toward the welding groove. This serves to rigidly secure one end of the member 11 to plate member 18. A second bull pin 23 is then driven between member 11 and U-bolt 20. This second bull pin serves to pull the plate member 17 into lateral alignment with plate member 18. A third bull pin 24 is then inserted in slot 16 on either side of the U-bolt 20 dependent upon whether it is necessary to separate or draw together the plate members 17 and 18 in order to provide the proper gap in the welding groove 19. When all the bull pins have been driven in sufficiently to bring the plates into their proper position for welding, the apparatus maintains the desired position until the weld metal is deposited in the groove. In cases where there is excessive distortion of the plate members 17 and 18 additional U-bolts and bull pins may be placed at other points along the member 11, as shown in dotted lines.

After the plates 17 and 18 have been properly positioned, the heating elements 15 are turned on to preheat the adjoining plates in the area of the welding groove 19. Recesses 13 and 14 are of a size sufficient to permit insertion of the heating elements after the rigging device is in place and the plate members have been drawn up to their proper position preparatory to welding.

When the plate members have been brought to the proper preheating temperature, weld metal is deposited as a continuous process along the welding groove 19. As hereinbefore mentioned, it is possible, by reason of the recess 12 directly over the welding groove and the thinness of the strong-back member 11, to deposit weld metal along the entire seam without shifting or removing the rigging devices. As the weld metal is deposited in the groove, it shrinks upon cooling, thus inducing severe strains in the united plate members tending to cause substantial distortion thereof. Since the strong-back member 11 is disposed on edge, it offers maximum resistance to lateral displacement or distortion of the plate members 17 and 18. The only substantial distortion permitted by the rigging device is in the plane of the finished plate. Thus, the natural shrinkage in the welded joint will cause plate 18 to exert a substantial force in the direction of the weld. Slight movement of the plate 17 is permitted by reason of the flexibility in the bull pin 24 and the U-member 20. This will be apparent from an inspection of Fig. 3. It is obvious, of course, that where the bull pin 24 has been used to draw the plate members 17 and 18 together, shrinkage in the welded joint will merely release the pressure on the bull pin. Utilization of the flexibility feature in the slot and bull pin connection is required only when the bull pin has been used to hold the plate members apart. It is apparent from the drawings that the bull pins may be inserted in either direction, and that their proper insertion will be a matter of judgment within the skill of the mechanic assembling the rigging device.

While the rigging device may be held securely to the plate members solely by means of the U-bolts attached thereto, it is contemplated that the member 11 may also initially be secured to one of the plate members by welding at one or more places. This optional method of attachment is clearly shown in Figures 2 and 4. Attachment of member 11 by weld metal may be supplemental to the U-bolt 21 as shown in Figure 2, or it may permit the elimination of the U-bolt.

I have thus far described the invention as particularly applied to the longitudinal welding of curved plate members, as would be required in the construction of cylindrical vessels requiring longitudinal seams. It will be obvious, however, that the strong-back member 11 may also be a straight bar employed for the purpose of uniting flat plate members. Furthermore, in order to provide a suitable rigging device for the welding of girth seams, as where a cylindrical vessel is built up from a plurality of cylindrical sections attached end to end, I have modified the bar member as shown in Figure 4. Figure 4 shows the rigging device arranged vertically to unite two cylindrical sections 25 and 26 disposed one on top of the other. The inner edge of member 11 is provided with an extended tapered portion 27 extending from a point adjacent the outer side of recess 13 to the end of the member 11. In assembling the cylindrical members and the rigging device for welding a girth seam, the first cylindrical section is placed with its axis in an upright position and the member 11 is attached to the outside of the cylinder either by welding or by the use of a U-bolt and bull pin. The member 11 is, of course, placed so that recess 12 will be adjacent the desired seam. The second cylindrical section 26 is then lowered into position on top of the first section. The tapered portion 27 serves as a guiding edge along which the lower rim of the upper section may slide until it reaches its proper position of alignment with the lower section. While I have shown merely a fragmentary portion of each cylinder 25 and 26, and a single rigging device for uniting the same, it is contemplated that a plurality of such rigging devices will be disposed about the periphery of the lower cylindrical section to guide the upper section to its proper position. When the two sections are properly aligned, a U-bolt is attached to the upper section centrally of the slot 16 in member 11. Bull pins are then inserted as heretofore described to make whatever slight adjustments are required in the alignment of the sections and to hold the sections in the desired position while the girth seam is welded.

Fig. 5 shows a modified form of strong-back member 11 which may be used in aligning and holding flat plate members in position for lap-welding. As hereinbefore stated, the plate engaging edge of the strong-back member is shaped to fit the contour of the desired finished plate. Other obvious modifications will readily be apparent, such as a straight edge leading away from one side of recess 12 and an arcuate edge leading away from the opposite side, as would be required when uniting a hemispherical cap to a cylindrical section.

From the foregoing it will be obvious that I have provided a rigging device of extremely simple construction, requiring a minimum of parts, which may readily be fabricated from inexpensive and normally readily available materials. The device, as described and illustrated, provides the maximum of resistance, considering its relatively light weight, to lateral distortions of the plate members from the desired contour. This maximum resistance to lateral displacement remains effective even though the device provides allowance for slight longitudinal expansion of the united plate members upon cooling of the welded seam. That is, the distortion of the plate is controlled so that it occurs substantially only in the plane of the desired contour.

While I have shown my invention in but three forms, it will be obvious to those skilled in the art that it is not so limited but is susceptible to various other changes and modifications without departing from the spirit thereof, and it is desired, therefore, that only such limitations shall be placed thereon as are specifically set forth in the appended claims.

I claim:

1. A device for holding plate members preparatory to welding along adjoining edges comprising an elongated strap member adapted to be set on edge transversely across the gap between said members, said strap member having a longitudinally curved narrow side coinciding with the desired curvature in the assembled plate structure transversely of said edges and having an elongated longitudinally extending slot through the side thereof, U-shaped members adapted to freely straddle said strap member and be welded at their ends to said plate members, at least one U-shaped member being provided for each plate member, and tapered pins adapted to be driven between the closed end of said U-shaped members and the outer edge of said strap, to conform the curvature of said plate members to the curvature of said strap member, and through said slot between an end thereof and a side of said U-shaped member to adjust the spacing between said adjoining edges, the connection between said slot and its associated pin and U-shaped members being yieldable to permit creepage of the plate member with respect to the strap member as a result of shrinkage in the welded joint upon cooling.

2. A device as in claim 1 in which the plate-engaging edge of said strap member is provided with a recess intermediate its ends adapted for positioning above the space between the plate members to permit free access for welding to the portion of the gap covered by said strap member.

3. A device as in claim 2 including additional recesses to either side of the first-mentioned recess in said strap member adapted to permit free passage transversely under said strap member of heating elements extending along the plate members parallel to the welding gap for the purpose of preheating the plate members preliminary to the welding operation.

4. A device as in claim 1 in which said U-shaped member associated with said slot is sufficiently resilient to permit slight relative movement between the plate to which it is attached and said strap member whereby said plate structure may freely contract upon cooling of the welded portion.

DONALD C. HOLT.

(References on following page)

REFERENCES CITED

The following references are of record in the file of this patent:

UNITED STATES PATENTS

| Number | Name | Date |
|---|---|---|
| 1,969,572 | Maurer | Aug. 7, 1934 |
| 2,101,856 | Hines | Dec. 14, 1937 |
| 2,108,077 | Robinson | Feb. 15, 1938 |
| 2,127,828 | Minton | Aug. 23, 1938 |
| 2,216,702 | Cole | Oct. 1, 1940 |
| 2,216,739 | Hines | Oct. 8, 1940 |
| 2,306,032 | Baumgard | Dec. 22, 1942 |
| 2,381,584 | Fulleton | Aug. 7, 1945 |